US010257278B2

(12) United States Patent
Goldstein

(10) Patent No.: US 10,257,278 B2
(45) Date of Patent: Apr. 9, 2019

(54) VEHICLE DEFINED SOURCE TRANSMITTER

(71) Applicant: Honeywell International Inc., Morris Plains, NJ (US)

(72) Inventor: David B. Goldstein, Washington, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 308 days.

(21) Appl. No.: 15/008,207

(22) Filed: Jan. 27, 2016

(65) Prior Publication Data

US 2017/0214743 A1 Jul. 27, 2017

(51) Int. Cl.
*G06F 15/16* (2006.01)
*H04L 29/08* (2006.01)
(Continued)

(52) U.S. Cl.
CPC .......... *H04L 67/12* (2013.01); *G06F 21/6209* (2013.01); *G08G 1/0112* (2013.01);
(Continued)

(58) Field of Classification Search
CPC ....... G07C 5/008; H01Q 1/1264; G01D 21/00
(Continued)

(56) References Cited

U.S. PATENT DOCUMENTS 5,459,469 A 10/1995 Schuchman
6,043,756 A 3/2000 Bateman et al.
(Continued)

FOREIGN PATENT DOCUMENTS

| EP | 3067710 | 9/2016 |
| JP | 200827011 | 2/2008 |
| JP | 2012089088 | 5/2012 |

OTHER PUBLICATIONS

US Patent and Trademark Office, "Notice of Allowance", "U.S. Appl. No. 14/865,037", dated Aug. 10, 2017, pp. 1-18, Published in: US.

(Continued)

*Primary Examiner* — Kyung H Shin
(74) *Attorney, Agent, or Firm* — Bookoff McAndrews, PLLC

(57) ABSTRACT

Systems and methods of crowd sourcing data are provided. In one embodiment, a method of crowd sourcing data comprises: receiving data region boundary information from an aggregation system, the data region boundary information defines boundaries of data regions; determining membership in a data group for a vehicle based on position of the vehicle within a region; determining whether another member of the data group has been selected as data source; determining whether the vehicle can provide information to the data aggregation system; broadcasting a self-nomination message for the information to members of the data group, wherein the self-nomination message self-selects the vehicle as data source for the information; wherein the self-nomination message identifies the type of information; and transmitting the information from the data source to the data aggregation system via a communication link, wherein only the data source transmits the information to the data aggregation system for the data group.

17 Claims, 5 Drawing Sheets

Figure 1:
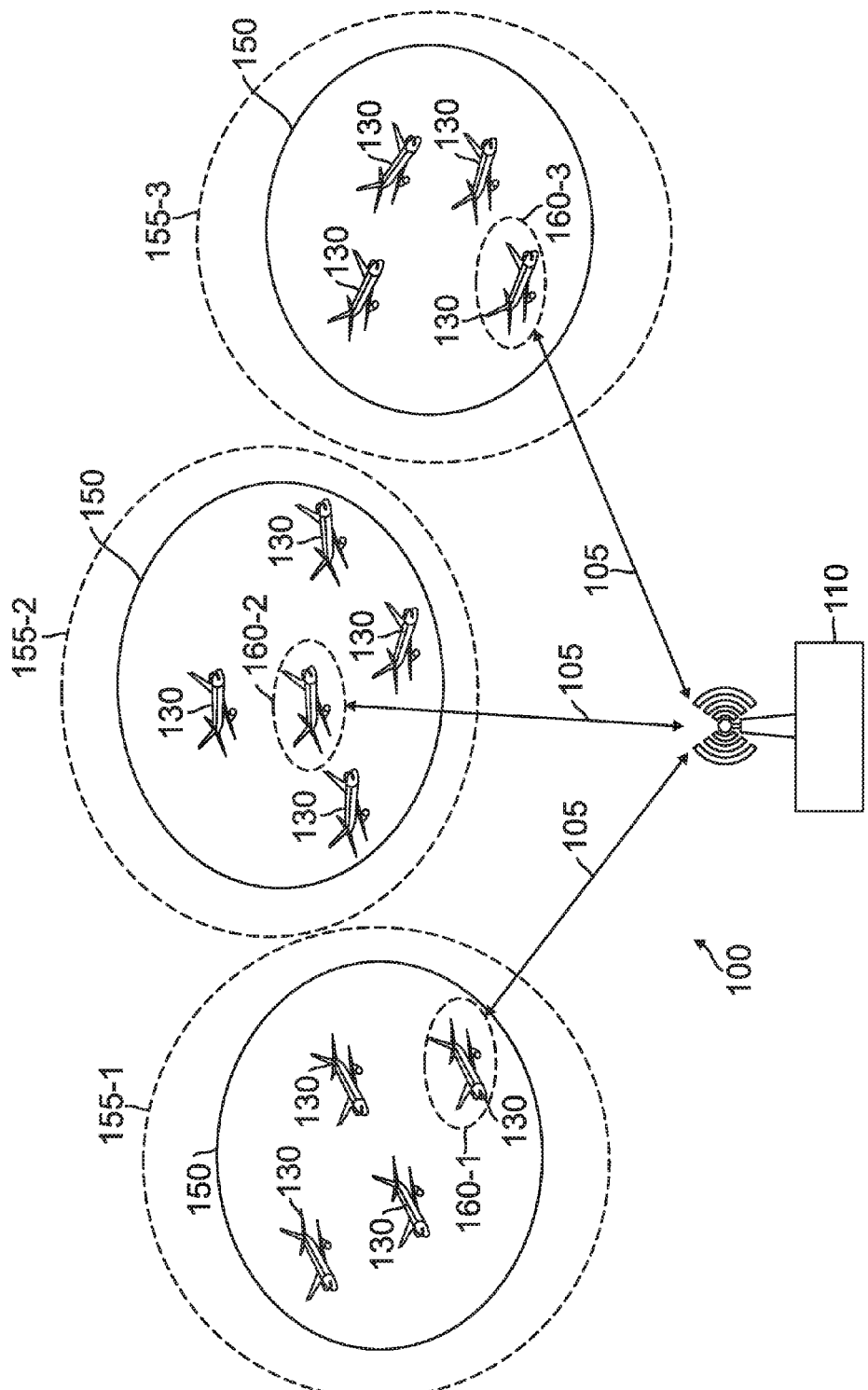

(51) Int. Cl.

| | | |
|---|---|---|
| *G08G 1/01* | (2006.01) | |
| *G08G 1/09* | (2006.01) | |
| *G08G 1/00* | (2006.01) | |
| *G08G 3/00* | (2006.01) | |
| *G08G 5/00* | (2006.01) | |
| *G08G 9/00* | (2006.01) | |
| *H04W 4/021* | (2018.01) | |
| *G06F 21/62* | (2013.01) | |
| *H04W 4/21* | (2018.01) | |
| *G07C 5/00* | (2006.01) | |
| *G07C 5/08* | (2006.01) | |
| *H04W 4/04* | (2009.01) | |
| *H04W 4/06* | (2009.01) | |
| *G01W 1/00* | (2006.01) | |

(52) U.S. Cl.
CPC ............ *G08G 1/093* (2013.01); *G08G 1/207* (2013.01); *G08G 3/00* (2013.01); *G08G 5/0008* (2013.01); *G08G 5/0013* (2013.01); *G08G 5/0026* (2013.01); *G08G 5/0082* (2013.01); *G08G 5/0091* (2013.01); *G08G 9/00* (2013.01); *H04L 67/18* (2013.01); *H04W 4/021* (2013.01); *G01W 2001/006* (2013.01); *G06F 2221/2111* (2013.01); *G06F 2221/2113* (2013.01); *G07C 5/008* (2013.01); *G07C 5/0816* (2013.01); *H04W 4/046* (2013.01); *H04W 4/06* (2013.01); *H04W 4/21* (2018.02)

(58) Field of Classification Search
USPC .................................................. 709/202, 217
See application file for complete search history.

(56) References Cited

U.S. PATENT DOCUMENTS

| | | |
|---|---|---|
| 6,181,260 B1 | 1/2001 | Simon et al. |
| 6,501,392 B2 | 12/2002 | Gremmert et al. |
| 7,069,147 B2 | 6/2006 | Manfred et al. |
| 7,471,995 B1 | 12/2008 | Robinson |
| 7,633,428 B1 | 12/2009 | McCusker et al. |
| 8,121,593 B2 | 2/2012 | Pandit et al. |
| 8,314,730 B1 | 11/2012 | Musiak et al. |
| 8,344,933 B1 | 1/2013 | Kronfeld et al. |
| 8,532,072 B2 | 9/2013 | Byard et al. |
| 8,593,991 B2 | 11/2013 | Byard et al. |
| 8,604,963 B1 | 12/2013 | Kronfeld et al. |
| 8,626,428 B2 | 1/2014 | Ramaiah et al. |
| 8,725,396 B2 | 5/2014 | Gueziec et al. |
| 8,762,035 B2 | 6/2014 | Levine et al. |
| 8,811,265 B2 | 8/2014 | Horvath |
| 8,965,699 B2 | 2/2015 | McDonald |
| 9,467,364 B2 | 10/2016 | Breshears |
| 2002/0039072 A1 | 4/2002 | Gremmert |
| 2002/0075179 A1 | 6/2002 | Hudson et al. |
| 2004/0183695 A1 | 9/2004 | Ruokangas et al. |
| 2005/0108374 A1 | 5/2005 | Pierzga et al. |
| 2005/0278120 A1 | 12/2005 | Manfred et al. |
| 2006/0251100 A1 | 11/2006 | Kim et al. |
| 2008/0076450 A1* | 3/2008 | Nanda .................... G01D 21/00 455/456.1 |
| 2009/0012663 A1 | 1/2009 | Mead et al. |
| 2009/0209196 A1 | 8/2009 | Haverty |
| 2009/0219197 A1 | 9/2009 | Bunch |
| 2010/0042275 A1 | 2/2010 | Kirk |
| 2010/0045452 A1* | 2/2010 | Periwal .................... B60Q 9/00 340/439 |
| 2010/0245164 A1 | 9/2010 | Kauffman |
| 2010/0332056 A1 | 12/2010 | Kirk |
| 2011/0054718 A1 | 3/2011 | Bailey |
| 2011/0057830 A1 | 3/2011 | Sampigethaya et al. |
| 2011/0183602 A1 | 7/2011 | Tietz |
| 2011/0187588 A1 | 8/2011 | Khatwa et al. |
| 2012/0158820 A1* | 6/2012 | Bai ........................ G07C 5/008 709/202 |
| 2012/0259549 A1 | 10/2012 | McDonald |
| 2012/0274484 A1 | 11/2012 | Zimmer et al. |
| 2013/0006450 A1 | 1/2013 | Del Amo Blanco et al. |
| 2013/0033387 A1 | 2/2013 | Trope |
| 2013/0079971 A1* | 3/2013 | Raghunathan ......... G07C 5/008 701/31.4 |
| 2013/0151622 A1 | 6/2013 | Goel et al. |
| 2013/0273839 A1 | 10/2013 | Breshears |
| 2014/0249735 A1 | 9/2014 | Levine et al. |
| 2014/0269474 A1 | 9/2014 | Zhu et al. |
| 2014/0333491 A1* | 11/2014 | Behroozi ............. H01Q 1/1264 343/706 |
| 2014/0348060 A1 | 11/2014 | Li et al. |
| 2014/0372038 A1 | 12/2014 | LeBlanc |
| 2015/0310747 A1 | 10/2015 | Frolik et al. |
| 2016/0266249 A1 | 9/2016 | Kauffman et al. |
| 2016/0285541 A1 | 9/2016 | Liu |
| 2017/0092139 A1 | 3/2017 | Wang et al. |
| 2017/0094590 A1 | 3/2017 | Wang et al. |

OTHER PUBLICATIONS

US Patent and Trademark Office, "Office Action", "U.S. Appl. No. 14/865,039", dated Sep. 8, 2017, pp. 1-48, Published in: US.

European Patent Office, "Communication under Rule 71(3) EPC from EP Application No. 17151098.5, dated Oct. 9, 2017", "from Foreign Counterpart of U.S. Appl. No. 15/008,207", dated Oct. 9, 2017, pp. 1-32, Published in: EP.

Wang et al., "Systems and Methods for Regulating Weather Information Collection", "U.S. Appl. No. 14/865,037, filed Sep. 25, 2015", , pp. 1-32, Published in: US.

Wang et al., "Systems and Methods for Collecting Weather Information for Selected Airspace Regions", "U.S. Appl. No. 14/865,039, filed Sep. 25, 2015", , pp. 1-26, Published in: US.

Airbus, "Flight Operations Briefing Notes", "Adverse Weather Operations Optimum Use of the Weather Radar", Feb. 2007, pp. 1-17, Publisher: Airbus.

Caballero-Gil et al., "Self-Organized Clustering Architecture for Vehicular Ad Hoc Networks", "International Journal of Distributed Sensor Networks", Jun. 9, 2015, pp. 1-13, vol. 2015, Publisher: Hindawi Publishing Corporation.

Chiti et al., "A Distributed Clustering Scheme With Self-Nomination: Proposal and Application to Critical Monitoring", "Wireless Networks", Jan. 1, 2015, pp. 329-345, vol. 21, No. 1, Publisher: Springer-Verlag New York, Inc., Published in: US.

Huang, "A Scalable Self-Diagnosing Content Distribution Service With Bounded Latency", "2007", pp. 1-170, Publisher: University of Illinois, Published in: US.

Phak, "Chapter 12 Aviation Weather Services", "Pilot's Handbook of Aeronautical Knowledge", Oct. 3, 2014, pp. 1-26, Publisher: Federal Aviation Administration.

Werth, "Airborne Weather Radar Limitations", "The Front", Dec. 2014, pp. 1-4, Publisher: National Weather Service.

Zhang et al., "Self-Nominating: A Robust Affordable Routing for Wireless Sensor Networks", "Vehicular Technology Conference, 2003", Oct. 6, 2003, pp. 2829-2833, Publisher: IEEE, Published in: US.

European Patent Office, "Communication under Rule 71(3) EPC from EP Application No. 16190018.8 dated Jul. 14, 2017", "from Foreign Counterpart of U.S. Appl. No. 14/865,037", filed Jul. 14, 2017, pp. 1-38.

European Patent Office, "Extended Search Report from EP Application No. 16190018.8 dated Jan. 26, 2017", "from Foreign Counterpart of U.S. Appl. No. 14/865,037", dated Jan. 26, 2017, pp. 1-12, Published in: EP.

US Patent and Trademark Office, "Advisory Action", "U.S. Appl. No. 14/865,037", dated Jun. 20, 2017, pp. 1-4.

US Patent and Trademark Office, "Final Office Action", "U.S. Appl. No. 14/865,037", dated Apr. 21, 2017, pp. 1-30, Published in: US.

US Patent and Trademark Office, "Office Action", "U.S. Appl. No. 14/865,037", dated Nov. 3, 2016, pp. 1-26, Published in: US.

(56) References Cited

OTHER PUBLICATIONS

European Patent Office, "Extended European Search Report from EP Application No. 16190013.9 dated Feb. 24, 2017", "from Foreign Counterpart of U.S. Appl. No. 14/865,039", dated Feb. 24, 2017, pp. 1-7, Published in: EP.

European Patent Office, "Extended European Search Report from EP Application No. 17151098.5, dated Jun. 7, 2017", "from Foreign Counterpart of U.S. Appl. No. 15/008,207", dated Jun. 7, 2017, pp. 1-5.

United States Patent and Trademark Office, "Notice of Allowance", "From U.S. Appl. No. 14/865,037", dated Dec. 15, 2017, pp. 1-20, Published in: US.

United States Patent and Trademark Office, "Notice of Allowance", "From U.S. Appl. No. 14/865,039", dated Dec. 6, 2017, pp. 1-13, Published in: US.

* cited by examiner

VEHICLE DEFINED SOURCE TRANSMITTER

BACKGROUND

For pilots of commercial aircraft, knowledge of weather data, in particular knowledge regarding hazardous weather along their planned route, is critical for safe operation of an aircraft. Presently, weather radar and other sensors equipped onboard the aircraft are utilized to gather weather data for the flight path ahead.

In recent years, crowd sourced data solutions have been proposed to enhance transportation efficiency and safety. In particular, information from various vehicles may be uploaded and downloaded and thus widely shared, increasing the amount and diversity of data available to the operators of vehicles. Such a system also benefits from the fact that localized information provided by vehicle sensors can be more accurate than information or data sensed at a centralized location. One problem with the crowd sourced data concept, however, is the potential additional heavy burden placed on communication datalinks. Commercial aircraft operations, in particular, are experiencing evolving and increasing utilization of air-ground datalinks for air traffic control, airline operations specific applications, and in-flight data services for passengers. Introduction of uploads and downloads of detailed crowd sourced information will only add to the burden of the wireless networks utilized by aircraft and other vehicles.

For the reasons stated above and for other reasons stated below which will become apparent to those skilled in the art upon reading and understanding the specification, there is a need in the art for alternate systems and method for crowd sourced information collection.

SUMMARY

The embodiments of the present disclosure provide systems and methods for collecting crowd sourced information and will be understood by reading and studying the following specification.

In one embodiment, a method for providing crowd sourced data for a data group comprises receiving data region boundary information from a data aggregation system, wherein the data region boundary information defines boundaries of a plurality of data regions. The method further comprises determining membership in a data group for a vehicle based on a position of the vehicle within a region. The method further comprises determining whether another member of the data group has been selected as a data source. The method further comprises determining whether the vehicle is capable of providing at least one type of information to the data aggregation system. The method further comprises broadcasting a self-nomination message for at least one type of information to members of the data group, wherein the self-nomination message self-selects the vehicle as a data source for the at least one type of information; wherein the self-nomination message identifies the at least one type of information. The method further comprises transmitting the at least one type of information from the data source to the data aggregation system via a data communication link, wherein only the data source transmits the at least one type of information to the data aggregation system for the data group.

DRAWINGS

Figure 1A:
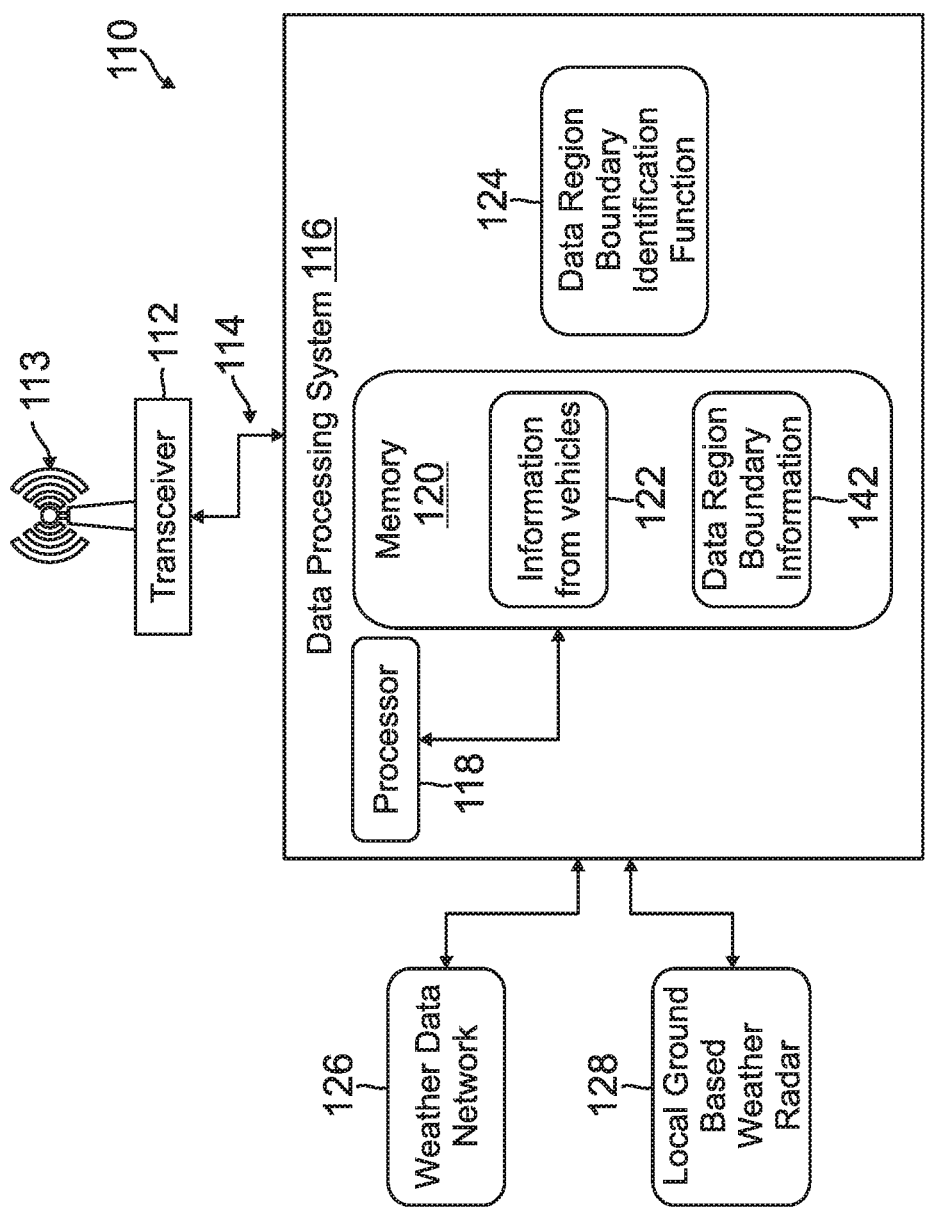
Figure 1B:
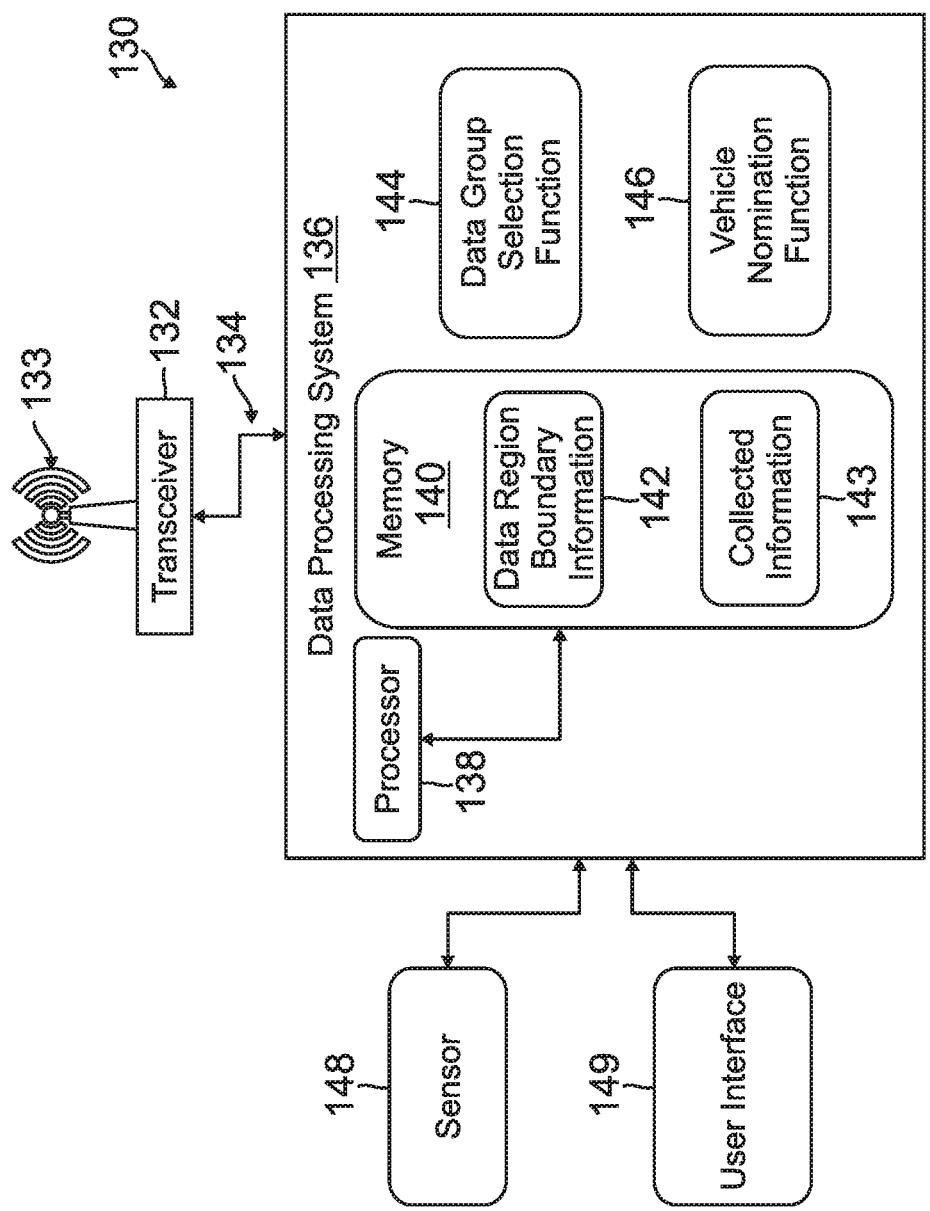
Figure 2:
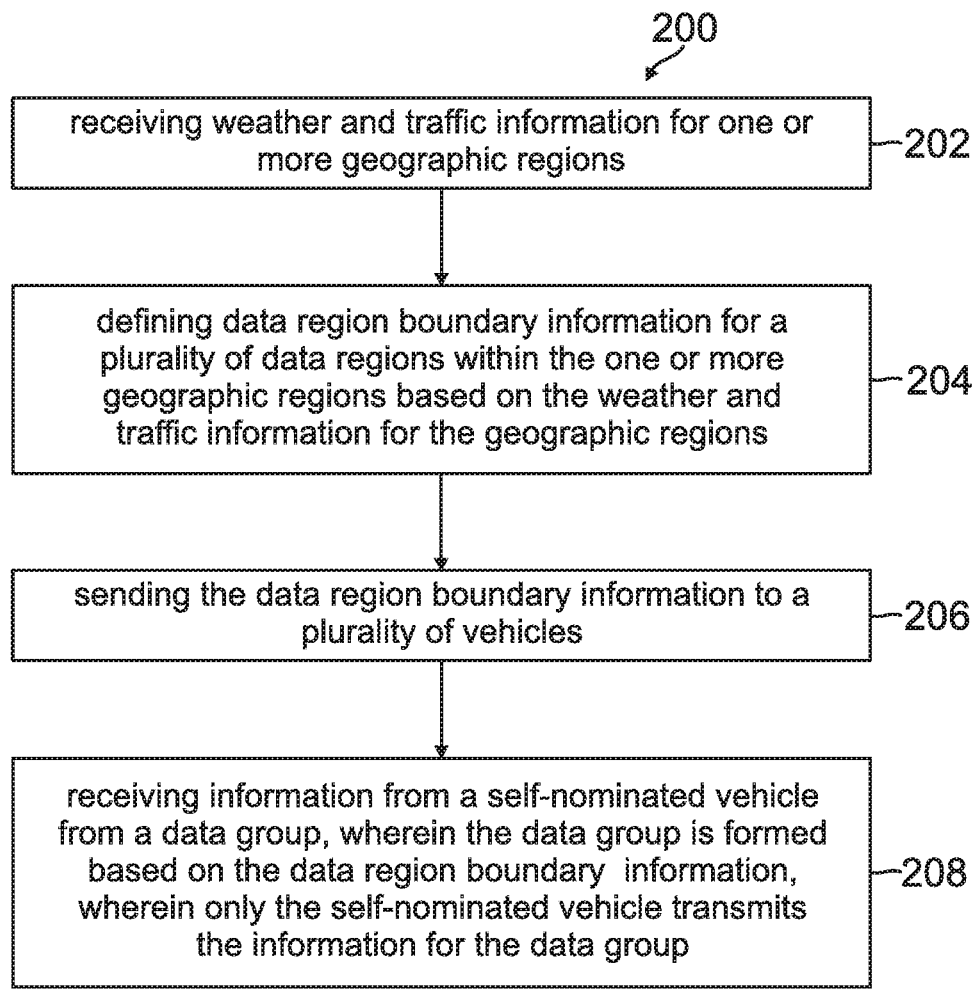
Figure 3:
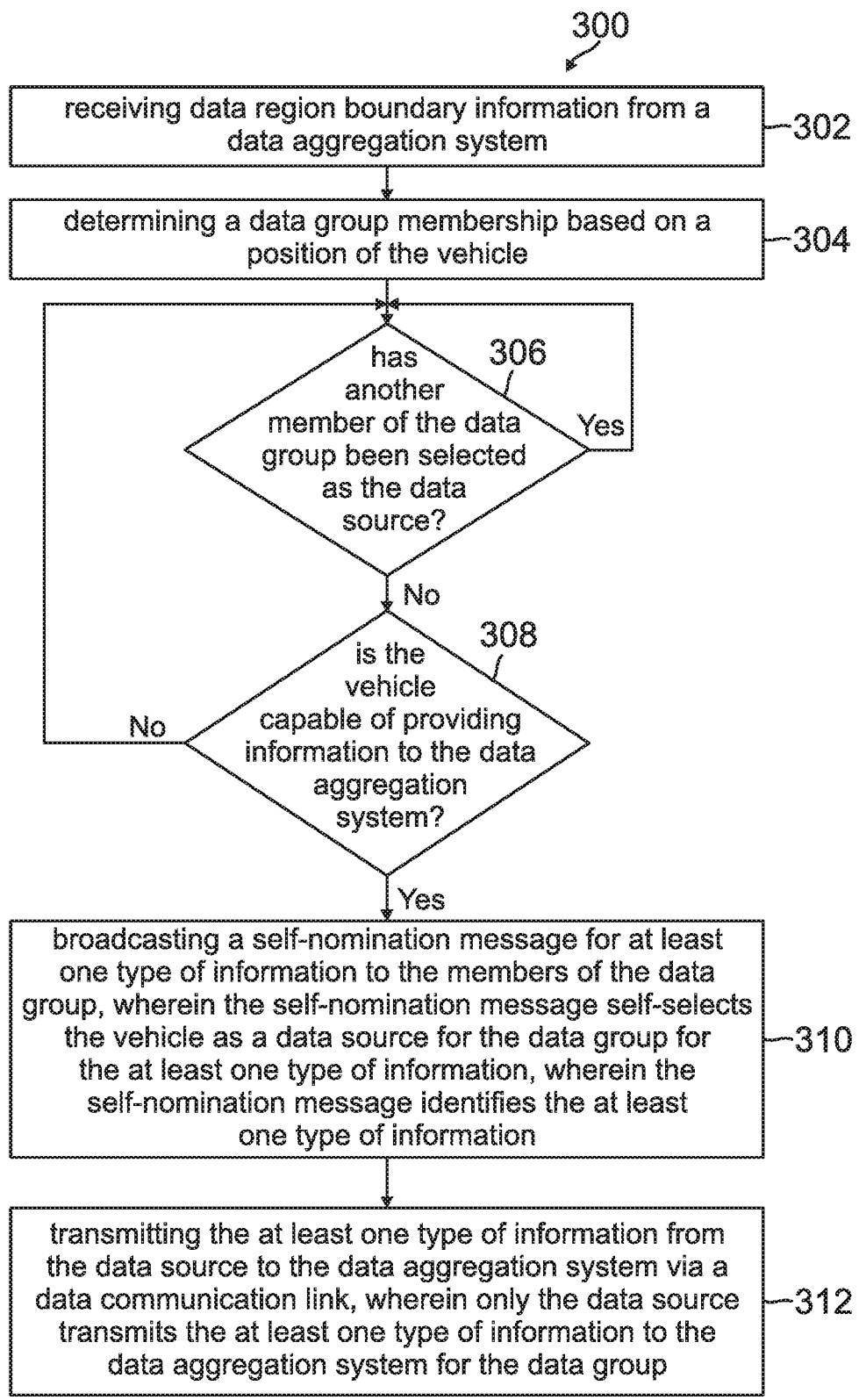

Understanding that the drawings depict only exemplary embodiments and are not therefore to be considered limiting in scope, the exemplary embodiments will be described with additional specificity and detail through the use of the accompanying drawings, in which:

FIGS. 1, 1A, and 1B include diagrams illustrating an example crowd sourced information system according to one embodiment of the present disclosure;

FIG. 2 is a flow chart illustrating a method according to one embodiment of the present disclosure; and FIG. 3 is a flow chart illustrating a method according to one embodiment of the present disclosure.

In accordance with common practice, the various described features are not drawn to scale but are drawn to emphasize specific features relevant to the exemplary embodiments. Reference characters denote like elements throughout figure and text.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present disclosure provide systems and methods for collecting crowd sourced information. More specifically, embodiments of the present disclosure categorize vehicles into different data groups based on the position of the vehicles and data region boundary information. Since each data group is defined based on the likelihood that the vehicles in the group are observing and/or experiencing similar conditions, it would be unnecessary for every member vehicle of a data group to transmit information to a data aggregation system. Therefore, with embodiments of the present disclosure, one or more representative vehicles may be selected from the data group to send information to the data aggregation system. Nomination of the one or more representative vehicles is based on self-selection by the vehicles. Further, the self-selection is based on information located onboard the vehicle, so the data aggregation system is not involved in the selection of the one or more representative vehicles. Accordingly, embodiments disclosed herein, among other things, reduce the redundant transmission of information and reduce communications between the data aggregation system and the vehicles to facilitate the self-selection process. Thus, the embodiments disclosed herein reduce cost and network burden.

FIG. 1 is a diagram illustrating a crowd sourced information system 100 of one embodiment of the present disclosure. System 100 comprises a data aggregation system 110 and a plurality of vehicles 130 in communication with the data aggregation system 110. The data aggregation system 110 aggregates and processes one or more types of information provided by the vehicles 130. In exemplary embodiments, the data aggregation system 110 is a ground-based system that includes one or more ground stations. In exemplary embodiments, the information provided by the vehicles 130 can include, but is not limited to, information related to weather, traffic, navigation conditions, natural disasters, political developments (e.g. a coup), and terrorist threats. In exemplary embodiments, the vehicles 130 comprise aircraft, ground based vehicles, marine vehicles, spacecraft, or the like.

As illustrated in FIG. 1A, in one embodiment, the data aggregation system 110 comprises at least one transceiver 112 coupled to a data processing system 116. The at least one transceiver 112 is coupled to at least one antenna 113 and incorporates electronics and other components to establish bidirectional wireless data communication links 105 with systems aboard the vehicles 130. Such communication links 105 may include, but are not limited to, Aircraft Communications Addressing and Reporting System (ACARS) datalinks and/or satellite communications (SATCOM). It should be appreciated that in alternate implementations, the transceiver 112 and the data aggregation system 110 may be located at the same physical ground facility or instead located at some remote distance from each other and connected by a communication link 114.

The data processing system 116 further comprises at least one processor 118 coupled to a memory 120 which may be used for storing information 122 collected from, and shared with, the plurality of vehicles 130. The processor 118 includes or functions with software programs, firmware, or other computer readable instructions for carrying out various methods, process tasks, calculations, and controls functions. In the embodiment shown in FIG. 1A, the data processing system 116 further comprises a data region boundary identification function 124. This function 124 may be implemented as a computer executable function or module executed by the at least one processor 118.

The data region boundary identification function 124 identifies a geographic region for which data from the plurality of vehicles 130 is desired. In some embodiments, the geographic region covers the entire world. In other embodiments, the geographic region covers only a portion of the world (e.g., a specific country or continent). The data region boundary identification function 124 divides the geographic region into a plurality of data regions 155. In exemplary embodiments, the data regions 155 comprise geographical areas, which are also referred to as tiles. The boundaries of the data regions 155 are defined by data regions boundary information. In some embodiments, the data region boundary information 142 includes geographical boundaries of the data regions 155. In other embodiments, the data region boundary information 142 includes boundaries for the data regions 155 based on isotherms, isobars, or other types of boundaries known to one having skill in the art.

In some embodiments, the data region boundary identification function 124 defines the data regions 155 statically. In other words, the data region boundary identification function 124 does not adjust the boundaries of the data regions 155 based on current data, but instead adjusts the boundaries of the data regions 155 based on data available prior to departure of the vehicles 130. In such embodiments, the data regions 155 are defined based on factors such as, but not limited to, geographic location, average amount of vehicle traffic, and average weather activity. In other embodiments, the data region boundary identification function 124 defines the data regions 155 dynamically based on current data. In such embodiments, the boundaries of the data regions 155 are defined based on factors such as, but not limited to, the current or predicted amount of vehicle traffic and current or predicted weather activity.

In some embodiments, the sizes of each of the respective data regions 155 are uniform compared to each other. In other embodiments, the sizes of the data regions 155 are not uniform. For example, the size of one of the data regions 155 can be decreased if the average amount of vehicle traffic is high or a high amount of vehicle traffic is experienced or predicted at a particular geographic location. Accordingly, a data region 155 near a major metropolitan area may be smaller than a data region 155 near a more rural geographic area. Also, a data region 155 for which the average amount of severe weather activity is high or severe weather activity has been reported or predicted may be smaller than a data region 155 for which the average amount of severe weather activity is low or there is no severe weather activity being reported or predicted.

Once the data regions 155 are defined, the data aggregation system 110 provides the data region boundary information 142 to the plurality of vehicles 130. In exemplary embodiments, the data region boundary information 142 is provided to the vehicles 130 prior to their departure. In other embodiments, the data region boundary information 142 can be dynamically provided to the vehicles 130 in route when updates are made to the size of the data regions 130. For example, if a severe weather event is detected that was not predicted prior to departure, an update to the data region boundary information 142 can be sent to the vehicles 130 via wireless data communication link 105.

During operation, the vehicles 130 form data groups 150 to monitor and provide data for the data regions 155. One or more data groups 150 are formed for each of the data regions 155. The one or more data groups 150 for a data region 155 include one or more vehicles 130 of the plurality of vehicles 130. The vehicles 130 making up each data group 150, also referred to herein as member vehicles, are similarly situated such that their onboard sensors 148 should be observing and/or experiencing similar conditions. In one embodiment, the selection of vehicles 130 to form a data group 150 is based on similar navigation path attributes such as, but not limited to, travel direction, inter-vehicle distance, altitude, and position. In exemplary embodiments, a single data group 150 is formed for each data region 155 and comprises the vehicles 130 positioned within the data region 155. In such embodiments, the data groups 150 change as vehicles 130 enter and leave the data regions 155. In some embodiments, two or more data groups 150 can be formed for a single data region 155. In such embodiments, vehicles 130 having similar navigation path attributes for long periods of time can be assigned to a data group 150 that does not change when entering or leaving a particular data region 155. For example, a line of aircraft flying the same predefined route could form a single data group for entire flight.

Once a data group 150 is defined, one of the member vehicles 130 is nominated as a representative vehicle 160 to transmit information to the data aggregation system 110. One or more representative vehicles 160 are selected for each data group 150 to be a data source. In exemplary embodiments, the representative vehicle 160 is selected after nominating itself. Since each individual vehicle 130 will be the best and most accurate source of knowledge regarding its capability to provide the information to the data aggregation system 110, the crowd sourced information system 100 utilizes self-nomination by the vehicles 130 when selecting the one or more representative vehicles 160 for each data group 150.

As illustrated in FIG. 1B, in one embodiment, an individual vehicle 130 comprises at least one transceiver 132 coupled to a data processing system 136. The at least one transceiver 132 is coupled to at least one antenna 133 and incorporates electronics and other components to establish bidirectional wireless data communication links 105 with the data aggregation system 110. Each vehicle 130 further includes one or more sensors 148 for navigation and/or data collection. In exemplary embodiments, the one or more sensors may include, but are not limited to, a Global Navigation Satellite System (GNSS) sensor, an Inertial Navigation System (INS), a weather radar, moisture sensors, turbulence sensors, thermometers, and wind sensors. In exemplary embodiments, the vehicle 130 may also include at least one user interface 149 for the driver, pilot, or crew to enter observations. In such embodiments, the driver, pilot, or crew may enter observations regarding traffic density, traffic collisions, navigation conditions (e.g. road or runway conditions), or natural disasters (e.g. volcano eruption). In exemplary embodiments, the user interface 149 comprises a control display device (CDU), a multifunction control and display device (MCDU), a multi-input interactive display device (MIDU), a multi-function display (MFD), or the like.

The vehicle 130 includes at least one processor 138 coupled to a memory 140 which may be used for storing the data region boundary information 142 and information 143 collected, and shared with, the data aggregation system 110. In the embodiment shown in FIG. 1B, the vehicle 130 further comprises a data group selection function 144 and a vehicle nomination function 146. These functions 144, 146 may be implemented as computer executable functions or modules executed by the at least one processor 138.

The data group selection function 144 identifies which data group 150 the vehicle 130 is within. In exemplary embodiments, the data group selection function 144 tracks transportation path attributes such as, for example, the exact position of the vehicle 130, the inter-vehicle distance between the vehicle 130 and its neighbors, the altitude of the vehicle 130, and/or the direction of travel of the vehicle 130. In exemplary embodiments, a vehicle's neighbors include the other vehicles 130 in the same data group 150. In some embodiments, a single data group 150 is formed for a data region 155. In such embodiments, the exact position of the vehicle 130 would be sufficient to determine which data group 150 the vehicle 130 is within. In other embodiments, more than one data group 150 is formed for a data region 155. In such embodiments, inter-vehicle distance, altitude, and direction of travel should also be used to more accurately determine the data group 150 that the vehicle 130 is within.

After the data group selection function 144 determines which data group 150 the vehicle 130 is within, the vehicle nomination function 146 determines whether the vehicle 130 should nominate itself to be the representative vehicle 160 for the data group 150. The vehicle nomination function 146 first determines whether another vehicle in the data group 150 has already been selected as the representative vehicle 160 for the data group 150. In exemplary embodiments, this determination is made based upon whether a self-nomination message has been received from another member vehicle. If not, the vehicle nomination function 146 determines whether the vehicle 130 is able to provide vehicle information 143 to the data aggregation system 110. In exemplary embodiments, the vehicle 130 can provide a subset of the vehicle information 143 sought by the data aggregation system 110. For example, the vehicle 130 can nominate itself to provide only weather information rather than all types of information provided to the data aggregation system 110. In exemplary embodiments, the vehicle nomination function 146 determines whether the vehicle 130 is able to provide vehicle information 143 to the data aggregation system 110 prior to determining whether another vehicle in the data group 150 has already been selected as the representative vehicle 160 for the data group 150.

If another vehicle has not be selected as the representative vehicle 160 and the vehicle 130 is able to provide vehicle information 143 to the data aggregation system 110, the vehicle 130 broadcasts a self-nomination message to the other member vehicles of its data group 150. In exemplary embodiments, the self-nomination message is broadcast through an ad-hoc vehicle-to-vehicle communication link. In exemplary embodiments, the self-nomination message contains an indication of the type of information 143 that the vehicle is able to provide to the data aggregation system 110. Further, in some embodiments, the self-nomination message contains an expiration of the self-nomination. For example, the vehicle will have a priori knowledge regarding its navigation path and can determine approximately when it will exit the data region 155 based on the navigation path and the boundaries of the data region 155. The other vehicles in the data group 150 are aware of the expiration and one of the other member vehicles for the data group 150 can broadcast a self-nomination message upon expiration of the previous self-nomination.

Since the member vehicles of a data group 150 may be constantly changing, the self-nomination message can be broadcast repeatedly to ensure that a new member vehicle does not also send a self-nomination message. In exemplary embodiments, the representative vehicle 160 sends its self-nomination message when a new member joins the data group 150. In other embodiments, the representative vehicle 160 sends its self-nomination message at a pre-defined interval (e.g. every 10 seconds). In embodiments where the data group 150 does not change, the initial self-nomination message from the representative vehicle 160 is sufficient.

In some embodiments, the representative vehicle 160 may lose its ability to further obtain or provide information 143 for the data group 150 during a time it is still scheduled to provide such information 143 to the data aggregation system 110. For example, the representative vehicle 160 may lose functionality of one or more onboard sensors 148. In such embodiments, the representative vehicle 160 may affirmatively rescind its self-nomination by broadcasting a message or notification to the other vehicles 130 in the data group 150.

As discussed above, the representative vehicle 160 for the data group 150 is the single data source for the data group 150 for a particular type of information. In other words, the other vehicles 130 in the data group 150 will not provide redundant information to the data aggregation system 110. In exemplary embodiments, the other vehicles 130 also will not broadcast a self-nomination message for the same type of information that the representative vehicle 160 is providing. In some embodiments, another vehicle 130 may experience a unique situation that is not reported by the representative vehicle 130 and can self-nominate to report the information to the data aggregation system 110. For example, an aircraft may experience turbulence not reported by the representative aircraft for the data group 150.

FIG. 2 is a flow chart illustrating an example method of operating a data aggregation system according to one embodiment of the present disclosure. The functions, structures, and other description of elements for such embodiments described above may apply to like named elements of method 200 and vice versa. In exemplary embodiments, the method 200 is performed by the data aggregation system 110 discussed above with reference to FIGS. 1 and 1A.

The method 200 begins at 202 with receiving weather and traffic information for one or more geographic regions. In some embodiments, the weather and traffic information includes average weather activity and average traffic information for the geographic regions. In some embodiments, the weather and traffic information can also include current or predicted weather activity for the geographic regions and current or predicted amount of vehicle traffic for the geographic regions.

The method proceeds to 204 with defining data region boundary information for a plurality of data regions within the one or more geographic regions based on the weather and traffic information for the geographic regions. In exemplary embodiments, the one or more geographic regions cover the entire world. In other embodiments, the one or more geographic regions cover only a portion of the world (e.g., a specific country or continent). In exemplary embodiments, data region boundary information comprises the boundaries of a plurality of data regions. In exemplary embodiments, the boundaries of the data regions are not uniform. For example, the boundaries of a data region covering a geographic region with a high amount of current or predicted vehicle traffic are smaller than the boundaries of a data region covering a geographic region with a small amount of current or predicted vehicle traffic. Similarly, the boundaries of a data region covering a geographic region with current or predicted severe weather activity are smaller than the boundaries of a data region covering a geographic region where there is little severe weather activity being reported or predicted.

The method proceeds to 206 with sending the data region boundary information to a plurality of vehicles. In some embodiments, the data region boundary information is provided to each of the plurality of vehicles only when each vehicle departs for travel. For example, a database containing the data region boundary information could be sent to an aircraft prior to takeoff via wired or wireless communication link. In other embodiments, the data region boundary information is provided to the plurality of vehicles during operation. For example, an update to the data region boundary information is sent to the plurality of vehicles via wireless data communication link whenever the boundaries of the data regions are changed.

The method proceeds to 208 with receiving information from a self-nominated vehicle from a data group, wherein the data group is formed based on the data region boundary information, wherein only the self-nominated vehicle transmits the information for the data group. In some embodiments, no more than one data group can be formed for a single data region of the plurality of data regions. In other embodiments, more than one data group can be formed for a single data region of the plurality of data regions.

FIG. 3 is a flow chart illustrating an example method of self-selection of a vehicle as a data source for a data group according to one embodiment of the present disclosure. The functions, structures, and other description of elements for such embodiments described above may apply to like named elements of method 300 and vice versa. In exemplary embodiments, method 300 can be performed in a different order. For example, step 308 can be performed prior to step 306. In exemplary embodiments, method 300 is performed by the vehicles 130 discussed above with reference to FIGS. 1 and 1B.

The method begins at 302 with receiving data region boundary information from a data aggregation system. In exemplary embodiments, the data region boundary information can be received prior to departure via wired or wireless data communication link or during operation via wireless data communication link. The data region boundary information is stored onboard the vehicle in a memory.

The method proceeds to 304 with determining a data group membership of the vehicle based on a position of the vehicle. In some embodiments, the vehicle determines its data group membership based only on its geographic location. In such embodiments, the vehicle compares its calculated position to the data region boundary information to determine which data region it is within. The vehicle can calculate its own position using, for example, a Global Navigation Satellite System (GNSS), an Inertial Navigation System (INS), or the like. In other embodiments, the vehicle determines its data group membership based on navigation path attributes such as, but not limited to, travel direction, inter-vehicle distance, altitude, and position.

The method proceeds to 306 with determining whether another member of the data group has been selected as the data source (representative vehicle) for the data group. In exemplary embodiments, the vehicle makes this determination based on whether it has received a self-nomination message from another vehicle in the data group.

In exemplary embodiments, when another vehicle has been selected as the data source for the data group, the method repeats step 306. In some embodiments, the method repeats step 306 after a timeout period. For example, the timeout period may be based on an expiration of the self-nomination message from another vehicle or may include a predetermined period of time. In other embodiments, the method may terminate and reengage at step 306 following a change in the system. For example, a change in the system may include the self-nomination message being rescinded by the data source.

When another vehicle has not been selected as the data source for the data group, the method proceeds to 308 with determining whether the vehicle is capable of providing information to the data aggregation system. In exemplary embodiments, the vehicle determines if one or more sensors used to collect information are operational. For example, an aircraft could determine whether its weather radar or other onboard weather sensors were operational. In exemplary embodiments, the vehicle includes at least one user interface for entering observations and determines whether the user interface is operational.

In exemplary embodiments, when the vehicle is not capable of providing information to the data aggregation system, the method proceeds back to step 306. In some embodiments, the method proceeds back to step 306 after a timeout period. For example, the timeout period may be based on an expiration of the self-nomination message from another vehicle or may include a predetermined period of time. In other embodiments, the method may terminate and reengage at step 306 when the vehicle is capable of providing information to the data aggregation system. For example, if the vehicle cannot provide information because a sensor on the vehicle is disabled, the method would reengage at step 306 upon repair of the sensor.

When another vehicle has not been selected as the data source for the data group and the vehicle is capable of providing information to the data aggregation system, the method proceeds to 310 with broadcasting a self-nomination message for at least one type of information to other member vehicles of the data group, wherein the self-nomination message indicates self-selection of the vehicle as a data source for the data group for the at least one type of information, wherein the self-nomination message identifies the at least one type of information. In exemplary embodiments, the self-nomination message also contains an expiration for the self-nomination message. In exemplary embodiments, the at least one type of information includes information regarding at least one of weather, traffic, navigation conditions, natural disasters, political developments (e.g. a coup), and terrorist threats. In some embodiments, the data source is the only source of data for the data group. In other words, the data source provides all of the information sent to the data aggregation system. In other embodiments, multiple vehicles may self-nominate as data sources for different types of information.

The method proceeds to 312 with sending the at least one type of information from the data source to the data aggregation system via a data communication link, wherein only the data source transmits the at least one type of information to the data aggregation system for the data group. In exemplary embodiments, the at least one type of information is sent via wireless data communication link.

The embodiments discussed herein provide numerous benefits over previous crowd sourced information systems. For example, the amount of communications between the vehicles and the data aggregation system can be reduced by implementing the self-nomination of the representative vehicle for each data group. Further, since only the representative vehicle is configured to provide data to the data aggregation system, redundant communications from multiple vehicles are reduced. Such a reduction in communication reduces the cost of aggregating the data while also ensuring that the relevant data for each data region is provided by the plurality of vehicles.

Further, the embodiments of the present disclosure allow for self-nomination to be made without the support of the data aggregation system or centralized entity to perform assignment of the representative vehicle. This flexibility allows for selection of a data source even if the plurality of vehicles are out of range of a centralized entity. For example, in embodiments where the vehicles are aircraft, the aircraft would not be within operating range of a ground station during portions of a trans-Pacific flight. Even under such conditions, the embodiments of the present disclosure enable selection of a data source.

Example Embodiments

Example 1 includes a method for providing crowd sourced data for a data group, the method comprising: receiving data region boundary information from a data aggregation system, wherein the data region boundary information defines boundaries of a plurality of data regions; determining membership in a data group for a vehicle based on a position of the vehicle within a region; determining whether another member of the data group has been selected as a data source; determining whether the vehicle is capable of providing at least one type of information to the data aggregation system; broadcasting a self-nomination message for at least one type of information to members of the data group, wherein the self-nomination message self-selects the vehicle as a data source for the at least one type of information; wherein the self-nomination message identifies the at least one type of information; and transmitting the at least one type of information from the data source to the data aggregation system via a data communication link, wherein only the data source transmits the at least one type of information to the data aggregation system for the data group.

Example 2 includes the method of Example 1, wherein determining whether another member of the data group has been selected as a data source comprises determining whether a self-nomination message for another member of the data group has been received by the vehicle.

Example 3 includes the method of any of Examples 1-2, wherein determining whether the vehicle is capable of providing information to the data aggregation comprises determining whether one or more sensors onboard the vehicle are operational.

Example 4 includes the method of any of Examples 1-3, further comprising: determining whether the vehicle is unable to continue operation as the data source; and broadcasting a notification to the member vehicles of the data group, wherein the notification rescinds the self-nomination of the vehicle as the data source.

Example 5 includes the method of any of Examples 1-4, wherein the at least one type of information includes information regarding at least one of: weather, traffic, navigation conditions, natural disasters, political developments, and terrorist threats.

Example 6 includes the method of any of Examples 1-5, wherein each data region of the plurality of data regions includes no more than one data group, wherein the at least one type of information for the data region is only transmitted by the data source to the data aggregation system for the data region.

Example 7 includes a vehicle for providing crowd sourced information, comprising: at least one transceiver configured to communicate with a data aggregation system via one or more data communication links; one or more onboard sensors; at least one processor coupled to a memory, wherein the at least one processor is configured to: receive data region boundary information from the data aggregation system, wherein the data region boundary information defines boundaries of a plurality of data regions; retrieve position information from at least one of the one or more onboard sensors; determine a membership in a data group for the vehicle based on the position information; determine whether another member vehicle of the data group has nominated itself as a representative vehicle for the data group; determine whether the vehicle is capable of providing at least one type of information; broadcast a self-nomination message to other member vehicles of the data group via the transceiver, wherein the self-nomination message indicates self-selection of the vehicle as the representative vehicle for the data group for the at least one type of information, wherein the self-nomination message identifies the at least one type of information; and transmit the at least one type of information for the data group from the representative vehicle to the data aggregation system via a data communication link.

Example 8 includes the vehicle of Example 7, wherein the vehicle comprises one of: an aircraft; a ground-based vehicle; a marine vehicle; and a spacecraft.

Example 9 includes the vehicle of Example 8, wherein the data aggregation system is a ground-based system that includes one or more ground stations.

Example 10 includes the vehicle of any of Examples 7-9, wherein the one or more onboard sensors include at least one of: a Global Navigation Satellite System (GNSS) sensor; and an Inertial Navigation System (INS).

Example 11 includes the vehicle of Example 10, wherein the one or more onboard sensors further include at least one of: a weather radar, a moisture sensor, a turbulence sensor, a thermometer, and a wind sensor.

Example 12 includes the vehicle of any of Examples 7-11, wherein the at least one processor is further configured to determine the membership in a data group for the vehicle based on travel direction and inter-vehicle distance between the vehicle and its neighbors.

Example 13 includes the vehicle of any of Examples 7-12, wherein each data region of the plurality of data regions includes no more than one data group.

Example 14 includes the vehicle of Example 13, wherein the self-nomination message further includes an expiration time for the self-nomination message.

Example 15 includes the vehicle of Example 14, wherein the at least one processor calculates the expiration time based on a navigation path of the vehicle and a geographical boundary of the data region.

Example 16 includes the vehicle of any of Examples 7-15, wherein the at least one processor is further configured to: determine when the vehicle is unable to continue operation as the representative vehicle; and when the vehicle is unable to continue operation as the representative vehicle, broadcast a message to the other member vehicles of the data group, wherein the message rescinds the self-nomination of the vehicle as the representative vehicle.

Example 17 includes the vehicle of any of Examples 7-16, further comprising at least one user interface, wherein the at least one user interface enables a driver, a pilot, or a crew to enter observations regarding the at least one type of information.

Example 18 includes a data aggregation system, comprising: at least one transceiver configured to communicate with a plurality of vehicles via one or more data communication links; a data processing system coupled to the at least one transceiver, the data processing system comprising a processor coupled to a memory that stores data provided by the vehicles; wherein the data processing system further comprises a data region boundary identification function, wherein the data region boundary identification function is configured to: divide one or more geographic regions into one or more data regions; and transmit data region boundary information to the plurality of vehicles, wherein the data region boundary information defines boundaries of the one or more data regions; wherein the data aggregation system is further configured to receive, via the at least one transceiver, information regarding the one or more data regions, wherein the information is provided by one or more representative vehicles for each of the one or more data regions, wherein the one or more representative vehicles are self-nominated.

Example 19 includes the crowd sourced information system of Example 18, wherein the data region boundary identification function is configured to divide one or more geographic regions into one or more data regions based on at least one of: predicted weather activity; and current weather activity.

Example 20 includes the crowd sourced information system of any of Examples 18-19, wherein the data region boundary identification function is configured to divide one or more geographic regions into one or more data regions based on at least one of: predicted traffic density; and current traffic density.

In various alternative embodiments, system elements, method steps, or examples described throughout this disclosure (such as the data processing systems, or sub-parts thereof, for example) may be implemented using one or more computer systems, field programmable gate arrays (FPGAs), or similar devices comprising a processor coupled to a memory (such as shown in FIG. 1A-1B, for example) and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for providing crowd sourced data for a data group, the method comprising:
   receiving data region boundary information from a data aggregation system, wherein the data region boundary information defines boundaries of a plurality of data regions;
   determining membership in a data group for a vehicle based on a position of the vehicle within a data region of the plurality of data regions;
   determining whether a second vehicle of the data group has been selected as a data source;
   in response to determining that the second vehicle has not been selected as the data source, determining whether the vehicle is capable of providing at least one type of information to the data aggregation system;
   in response to determining that the vehicle is capable of providing the at least one type of information to the data aggregation system, broadcasting a self-nomination message for the at least one type of information to members of the data group, wherein the self-nomination message indicates the vehicle as a data source for the at least one type of information by self-selecting the vehicle as the data source, wherein the self-nomination message includes an indication of the at least one type of information and an expiration time of the self-nomination message, wherein the expiration time is calculated based on a navigation path of the vehicle and a geographical boundary of the data region included among the boundaries of the plurality of data regions; and
   transmitting the at least one type of information from the data source to the data aggregation system via a data communication link, wherein only the data source transmits the at least one type of information to the data aggregation system for the data group.

2. The method of claim 1, wherein the determining whether the second vehicle of the data group has been selected as the data source comprises determining whether a self-nomination message for the second vehicle of the data group has been received by the vehicle.

3. The method of claim 1, wherein the determining whether the vehicle is capable of providing the information to the data aggregation system comprises determining whether one or more sensors onboard the vehicle are operational.

4. The method of claim 1, further comprising:
determining whether the vehicle is unable to continue operation as the data source; and
broadcasting a notification to the members of the data group, wherein the notification rescinds the self-nomination of the vehicle as the data source.

5. The method of claim 1, wherein the at least one type of information includes information regarding at least one of: weather, traffic, navigation conditions, natural disasters, political developments, and terrorist threats.

6. The method of claim 1, wherein each data region of the plurality of data regions includes no more than one data group, wherein the at least one type of information for the data region is only transmitted by the data source to the data aggregation system for the data region.

7. A vehicle for providing crowd sourced information, comprising:
at least one transceiver configured to communicate with a data aggregation system via one or more data communication links;
one or more onboard sensors;
at least one processor coupled to a memory, wherein the at least one processor is configured to:
receive data region boundary information from the data aggregation system, wherein the data region boundary information defines boundaries of a plurality of data regions;
retrieve position information from at least one of the one or more onboard sensors;
determine a membership in a data group for the vehicle based on the position information and a data region of the plurality of data regions;
determine whether a second vehicle of the data group has nominated itself as a representative vehicle for the data group;
in response to determining that the second vehicle has not nominated itself as the representative vehicle for the data group, determine whether the vehicle is capable of providing at least one type of information;
in response to determining that the vehicle is capable of providing the at least one type of information, broadcast a self-nomination message to other member vehicles of the data group via the transceiver, wherein the self-nomination message indicates self-selection of the vehicle as the representative vehicle for the data group for the at least one type of information, wherein the self-nomination message includes an indication of the at least one type of information and an expiration time of the self-nomination message, wherein the expiration time is calculated based on a navigation path of the vehicle and a geographical boundary of the data region included among the boundaries of the plurality of data regions; and
transmit the at least one type of information for the data group from the representative vehicle to the data aggregation system via a data communication link.

8. The vehicle of claim 7, wherein the vehicle comprises one of:
an aircraft;
a ground-based vehicle;
a marine vehicle; and
a spacecraft.

9. The vehicle of claim 8, wherein the data aggregation system is a ground-based system that includes one or more ground stations.

10. The vehicle of claim 7, wherein the one or more onboard sensors include at least one of: a Global Navigation Satellite System (GNSS) sensor; and an Inertial Navigation System (INS).

11. The vehicle of claim 10, wherein the one or more onboard sensors further include at least one of: a weather radar, a moisture sensor, a turbulence sensor, a thermometer, and a wind sensor.

12. The vehicle of claim 7, wherein the at least one processor is further configured to determine the membership in a data group for the vehicle based on travel direction and inter-vehicle distance between the vehicle and its neighbors.

13. The vehicle of claim 7, wherein each data region of the plurality of data regions includes no more than one data group.

14. The vehicle of claim 7, wherein the at least one processor is further configured to:
determine when the vehicle is unable to continue operation as the representative vehicle; and
when the vehicle is unable to continue operation as the representative vehicle, broadcast a message to the other member vehicles of the data group, wherein the message rescinds the self-nomination of the vehicle as the representative vehicle.

15. The vehicle of claim 7, further comprising at least one user interface, wherein the at least one user interface enables a driver, a pilot, or a crew to enter observations regarding the at least one type of information.

16. A data aggregation system, comprising:
at least one transceiver configured to communicate with a plurality of vehicles via one or more data communication links;
a data processing system coupled to the at least one transceiver, the data processing system comprising a processor coupled to a memory that stores data provided by the vehicles;
wherein the data processing system further comprises a data region boundary identification function configured to:
divide one or more geographic regions into one or more data regions based on at least one of predicted weather activity and current weather activity; and
transmit data region boundary information to the plurality of vehicles, wherein the data region boundary information defines boundaries of the one or more data regions;
wherein the data aggregation system is further configured to receive, via the at least one transceiver, information regarding the one or more data regions, wherein the information is provided by one or more representative vehicles for each of the one or more data regions, wherein the one or more representative vehicles are self-nominated,
wherein the data aggregation system is further configured to receive, via the at least one transceiver, additional information regarding a data region of the one or more data regions from a second vehicle in the data region that has a different experience that is not reported by a representative vehicle of the data region.

17. The data aggregation system of claim 16, wherein the data region boundary identification function is further configured to divide the one or more geographic regions into the one or more data regions based on at least one of:
 predicted traffic density; and
 current traffic density.

\* \* \* \* \*